United States Patent [19]

Goran

[11] Patent Number: 5,007,779
[45] Date of Patent: Apr. 16, 1991

[54] STANDOFF RETAINER

[75] Inventor: James L. Goran, Orchard Lake, Mich.

[73] Assignee: Ford Motor Company, Dearborn, Mich.

[21] Appl. No.: 419,183

[22] Filed: Oct. 10, 1989

[51] Int. Cl.⁵ .............................................. F16B 13/06
[52] U.S. Cl. ...................................... 411/48; 411/41; 411/60; 411/908
[58] Field of Search .............................. 411/41, 45–48, 411/60, 508–510, 913, 182, 908; 24/297, 453

[56] References Cited

U.S. PATENT DOCUMENTS

| | | |
|---|---|---|
| 2,767,877 | 10/1956 | Newsom . |
| 2,936,015 | 5/1960 | Rapata . |
| 2,984,698 | 5/1961 | Strauss .................................... 411/510 |
| 3,217,584 | 11/1965 | Amesbury . |
| 3,449,799 | 6/1969 | Bien . |
| 3,611,861 | 10/1971 | Schulze . |
| 3,869,958 | 3/1975 | Murayama . |
| 3,908,235 | 9/1975 | Telliard et al. . |
| 4,122,583 | 10/1978 | Grittner et al. . |
| 4,497,516 | 2/1985 | Morita et al. . |
| 4,579,473 | 4/1986 | Brugger .................................... 411/41 |
| 4,716,633 | 1/1988 | Rizo .......................................... 24/297 |
| 4,760,495 | 7/1988 | Till . |
| 4,786,225 | 11/1988 | Poe et al. ................................. 411/45 |
| 4,861,208 | 8/1989 | Boundy .................................... 411/908 |

Primary Examiner—Neill R. Wilson
Attorney, Agent, or Firm—Daniel M. Stock; Roger L. May

[57] ABSTRACT

A standoff retainer is provided for effecting the securing of two panels to each other in spaced planar facing relationship. The retainer lockingly engages a push pin after being received in snap-fit relationship by one of the panels. Ribs on the retainer space the panels, and a funnel surface on the retainer facilitates engagement with the push pin.

19 Claims, 2 Drawing Sheets

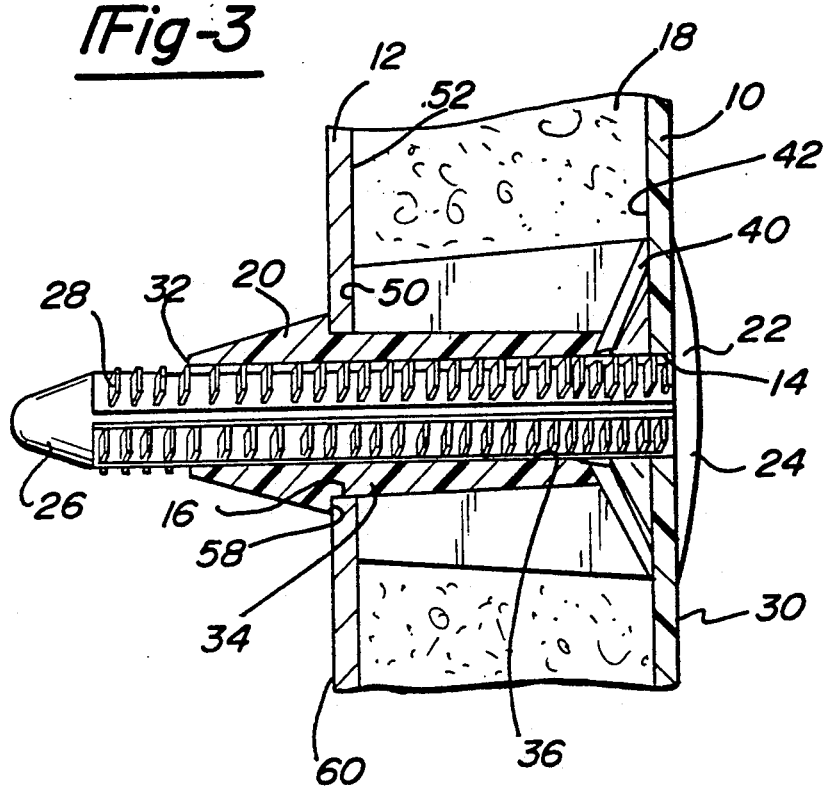
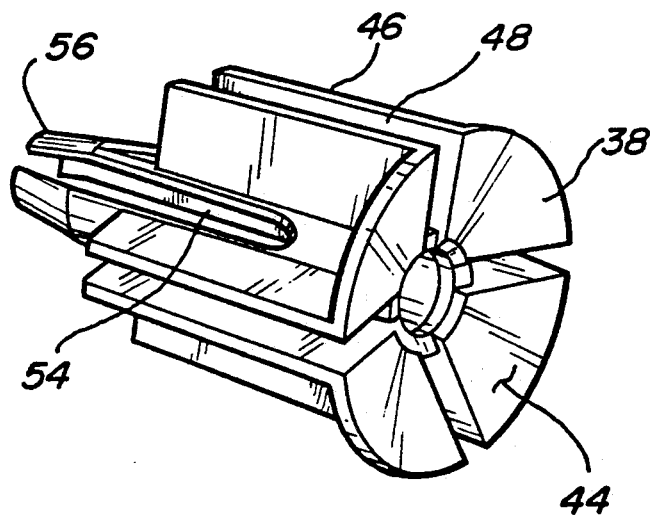

STANDOFF RETAINER

BACKGROUND OF THE INVENTION

The present invention relates to devices for controlling the spacing between adjacent panels while fastening the panels together, and more specifically to the application of such devices to the assembly of trim components of automotive vehicles.

In the assembly of automotive vehicles, it is desirable to facilitate the assembly of soft interior trim panels to the interior of the structural body panels of the vehicle in a manner that allows for the speedy fastening of the interior trim panel with respect to the structural body panel in a spaced relationship. In joining the interior trim panels to portions of the vehicle body, it is customary to use non-threaded fastening devices, referred to as push-pins. In using such fasteners, it is the normal practice to position some mating fastener or aperture on the opposite side of the structural body panel from that to which the trim panel is to be attached and to insert the push-pin into that fastener or aperture. Maintaining a spacing between the interior trim panel and the structural body panel has customarily been accomplished through the use of separate spacing components. The handling of these separate components and the care needed to align the push-pin with respect to its mating fastener tends to slow the assembly process. It is accordingly desirable that a retainer that will mate with the push-pin and concurrently control the spacing between the interior trim panel and the structural body panel would be desirable.

Standoff devices for use with threaded fasteners are known in the prior art. U.S. Pat. No. 4,760,495 to Till is exemplary of such devices. While such devices could supply the desired panel spacing function, they suffer from certain disadvantages. They are relatively massive in that the standoff device itself is utilized to transfer tensile load joining the adjacent panels together. Further, the nature of the configuration for receiving the threaded fastener inherently requires precision alignment of one fastener with respect to the other and, of course, requires the use of rotary tooling for assembly.

SUMMARY OF THE INVENTION

Responsive to the needs for improvement in automotive assembly and to the deficiencies in the prior art, it is an object of the present invention to provide a standoff retainer configured to receive a push-pin in axially locking relationship, which provides for the easy insertion of the push-pin. It is a further object of the present invention to provide such a standoff retainer which is configured to be received in snap-fit relationship in one panel, to be lockingly engaged therein by cooperation with the engagement with the push-pin.

According to one feature of the invention, a standoff retainer is provided which includes an elongated body having a bore for lockingly engaging a push-pin and having a mounting flange facing one panel which presents a funnel surrounding the bore for facilitating insertion of the push-pin.

According to another feature of the present invention, the standoff retainer further includes a plurality of ribs extending from the mounting flange to abuttingly engage a second panel and terminating adjacent a plurality of resilient barbs through which snap-fit insertion and compressive engagement with the other panel is effected.

BRIEF DESCRIPTION OF THE DRAWINGS

These and other objects and features of the present invention will become apparent to those skilled in the fastener arts upon reading the following description with reference to the accompanying drawing in which:

FIG. 3 is a cross-sectional view of the assembled panels of FIG. 2; and

FIG. 4 is a perspective view of the standoff retainer of the present invention.

DESCRIPTION OF THE PREFERRED EMBODIMENT

Figure 1:
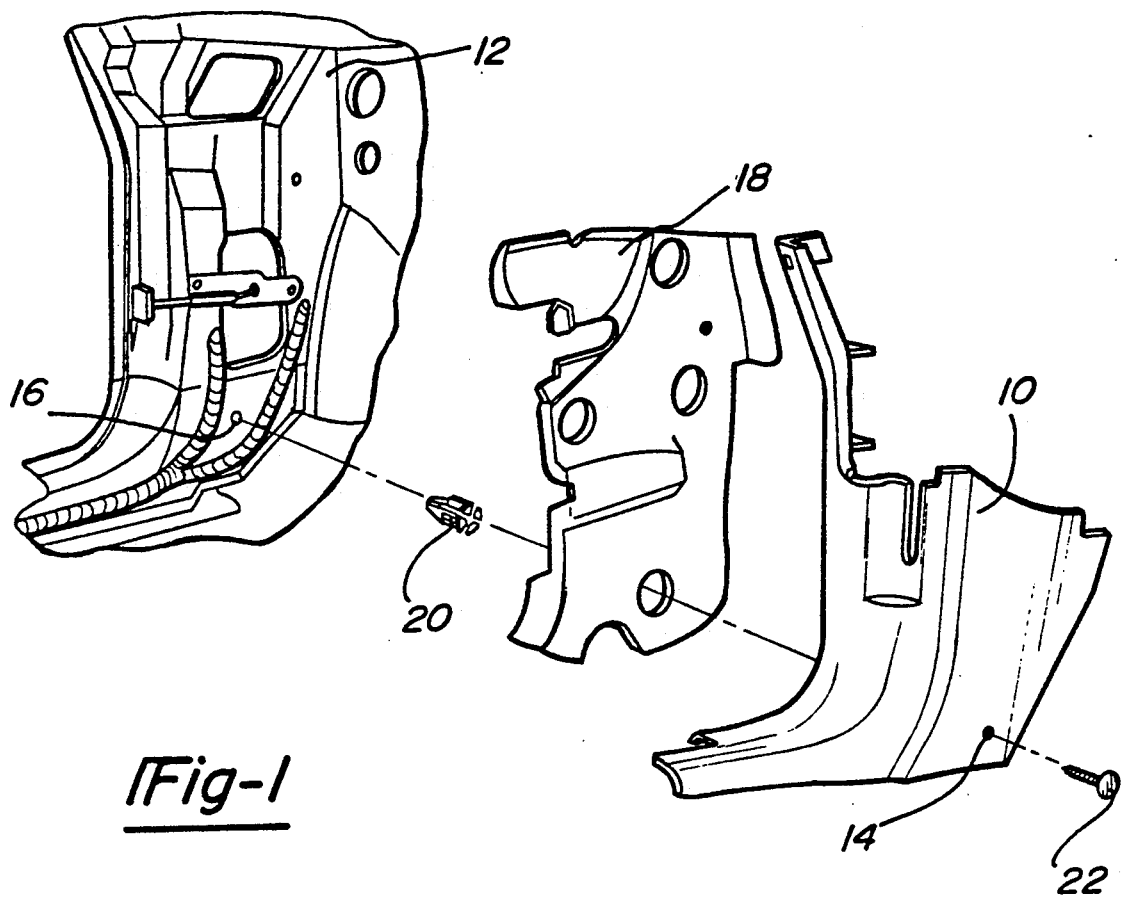
FIG. 1 is an exploded perspective view illustrating the assembly of an automotive interior trim panel to an internal structural body panel of an automobile.

Turning now to the drawings and in particular to FIG. 1 thereof, the securing of an interior trim panel 10 to an internal structural body panel 12 of an automotive vehicle is illustrated. The interior trim panel 10 is illustrated as including an access hole 14 that is registerable with a mounting hole 16 formed through the structural body panel 12. In such vehicle assemblies, an insulating panel 18 is normally positioned intermediate the trim panel 10 and the structural body panel 12 and includes a clearance hole formed through it and alignable with the access hole 14 of the trim panel 10 and the mounting hole 16 of the structural panel 12. The interior trim panel 10, the structural body panel 12 and the insulating panel 18 are secured together in sandwich-like fashion through the use of a standoff retainer 20 in cooperation with a push-pin 22.

Figure 2:
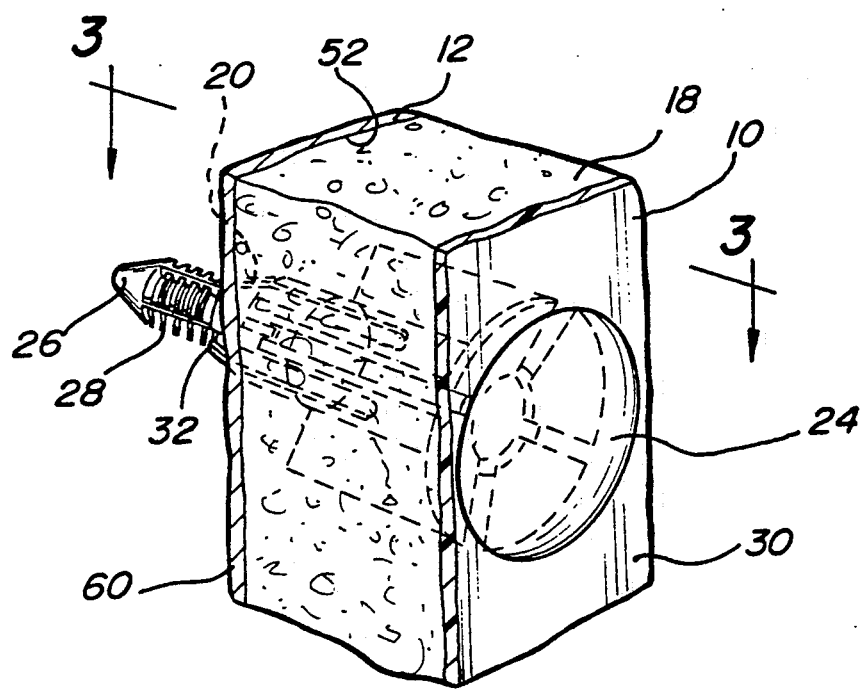
FIG. 2 is a perspective view partially in cross-section illustrating the assembled position of a push-pin in cooperation with the invention standoff retainer for joining the panels in spaced relationship.

As can be readily seen in FIGS. 2 and 3, the standoff retainer 20 is received in the mounting hole 16 of the structural body panel 12 and is configured to maintain a space between the structural body panel 12 and the interior trim panel 10. The panels 10, 12 are secured together by insertion of the push-pin 22 into the standoff retainer 20 to effect clamping engagement.

The push-pin retainer 22 includes an enlarged head portion 24 and an elongated shank 26 on which is arrayed a plurality of retrorse fins 28. The head 24 is sized to exceed the diameter of the access hole 14 to abuttingly engage the outer surface 30 of the interior trim panel 10 upon insertion to the position shown in FIGS. 2 and 3. The retrorse fins are conveniently configured to be canted toward the head 24 for facilitating insertion into the standoff retainer 20. The push-pin 22 is formed preferably of a flexible plastic material and consequently the retrorse fins 28 may deflect radially inwardly during insertion and then after passing beyond the end 32 of the standoff retainer 20, spring back to effect locking engagement against that end.

The standoff retainer 20 of the present invention preferably includes a body 34 of elongated proportions having axially extending through bore 36 sized to receive the shank 26 of the push-pin 22. At the opposite end 38 of the standoff retainer 20 from the end 32 against which the retrorse fins 28 of the push-pin 22 are lockingly engaged, a mounting flange 40 is formed for abuttingly engaging and serving as a support surface for the outer surface 42 of the interior trim panel 10. To facilitate insertion of the push-pin 22 into the through bore 36 after insertion through the clearance hole 14, a funnel surface 44 is formed on the annular face of the mounting flange 40.

Extending perpendicularly from the mounting flange 40 are a plurality of spacing ribs 46. In the preferred embodiment illustrated, the ribs 46 are formed in pairs, there being four pairs of ribs, and each of the pairs is separated by an axially running slot 48 to facilitate the molding manufacturing of the standoff retainer 20 as a molded plastic product. The free ends 50 of the ribs 46 abuttingly engage the facing surface 52 of the structural body panel 12 to effect the desired spacing support between the panels 10, 12.

Axially adjacent the ribs 46 distal of the mounting flange 40, there is preferably formed a locking groove 54 for engagement with the structural body panel 12. Extending axially beyond the groove 54 are a plurality of triangular shaped locking barbs 56 which thus are supported in cantilever fashion from the body 34. The radial flexibility and radial deflection compliance of the barbs 56 is enhanced by the provision of axially extending slots 58 extending into the body and its through bore 36, as may best be seen in FIG. 4. This formation of the barbs 56 enhances both the ease of assembly of the standoff retainer 20 into the structural body panel 12, and the secure attachment of the panels 10, 12 together through agency of the push-pin 22. The barbs 56, upon insertion into the mounting hole 16, deflect radially inwardly in ramp engagement as the standoff retainer 20 is inserted, and upon the locking surface 58 of the barbs 56, passing beyond the outer surface 60 of the structural body panel 12, the barbs 56 spring outwardly to the locking position shown in FIG. 2. This effects axial retention of the standoff retainer 20 with respect to the structural body panel 12. It will be understood, however, that some diametrical clearance may exist between the groove 54 and the mounting hole 16. Because of the flexibility and compliance of the design of the barbs, insertion of the push-pin 22, whose retrorse fins 28 preferably are sized to have a free extension beyond the inner diameter of the through bore 36 will tend to urge the portion of the body 34 adjacent the groove 54 radially outward into compressive engagement.

While only one embodiment of the standoff fastener of the present invention is shown and described, others will be possible without departing from the scope of the appended claims.

What is claimed is:

1. A standoff retainer for receiving a push-pin to secure a first panel to a second panel in spaced planar facing relationship with respect thereto, the panels each having an aperture formed therethrough, the standoff retainer comprising:
    an elongated body positionable to extend between said panel apertures;
    a through bore extending axially through said body between said panel apertures and adapted to receive said push-pin in axially locking relationship;
    a mounting flange surrounding said through bore and abuttingly engagable with said first panel;
    a plurality of circumferentially spaced standoff ribs extending perpendicularly from said mounting flange and having distal ends abuttingly engagable with said second panel;
    snap-fit locking means integrally formed with said body for engaging said second panel aperture in the snap-fit axially fast relationship; and
    means defining a funnel on the surface of said mounting flange facing said first panel, said funnel surrounding said through bore.

2. A standoff retainer as defined in claim 1, wherein said standoff retainer is formed as a unitary member.

3. A standoff retainer as defined in claim 2, wherein said unitary member is a molded member.

4. A standoff retainer as defined in claim 3, wherein said molded unitary member is formed of nylon.

5. A standoff retainer for receiving a push-pin to secure a first panel to a second panel in spaced planar facing relationship with respect thereto, the panels each having an aperture formed therethrough, the standoff retainer comprising:
    an elongated body positionable to extend between said panel apertures;
    a through bore extending axially through said body between said panel apertures and adapted to receive said push-pin in axially locking relationship;
    a mounting flange surrounding said through bore and abuttingly engagable with said first panel;
    a plurality of circumferentially spaced standoff ribs extending perpendicularly from said mounting flange and having distal ends abuttingly engagable with said second panel;
    means defining an annular locking groove in said body adjacent said rib distal ends for radially compressive engagement in said second panel aperture; and
    a plurality of circumferentially spaced barbs abuttingly engaging said second panel having outer surfaces extending radially outwardly beyond said second panel aperture and carried adjacent said locking groove and including means resiliently mounting said barbs with respect to said body and operative to permit deflection of said barbs radially inwardly to permit insertion of said barbs through said second panel aperture to a position wherein said locking groove is received in said second panel aperture.

6. A standoff retainer as defined in claim 5, wherein said standoff retainer is formed as a unitary member.

7. A standoff retainer as defined in claim 6, wherein said unitary member is a molded member.

8. A standoff retainer as defined in claim 7, wherein said unitary molded member is formed of nylon.

9. A standoff retainer as defined in claim 5, and further comprising:
    means defining a funnel on the surface of said mounting flange facing said first panel, said funnel surrounding said through bore.

10. A standoff retainer as defined in claim 9, wherein said standoff retainer is formed as a unitary molded member.

11. A standoff retainer as defined in claim 5, wherein said means for resiliently mounting said barbs comprises a plurality of slots formed through said body circumferentially spacing said barbs and extending axially parallel to said through bore and circumferentially spaced between said ribs.

12. A standoff retainer as defined in claim 11, wherein said standoff retainer is formed as a unitary member.

13. A standoff retainer as defined in claim 11, wherein said unitary member is a molded member.

14. A standoff retainer as defined in claim 11, wherein said molded unitary member is formed of nylon.

15. A fastening system for securing a trim panel to a body panel of an automotive vehicle, each panel having an aperture formed therethrough and the apertures being positionable in registration with each other, the system comprising:
- a push-pin;
- a standoff retainer including:
- a body having an axially extending bore for lockingly receiving said push-pin;
- snap-fit retention means receivable in said body panel aperture in axially fast relationship;
- a funnel surrounding said bore and substantially registering with said trim panel aperture to facilitate insertion of said push-pin; and
- spacing ribs extending between and abuttingly engagable with said trim panel and said body panel for maintaining spaced relationship therebetween.

16. A standoff retainer as defined in claim 15, wherein said standoff retainer is formed as a unitary member.

17. A standoff retainer as defined in claim 15, wherein said unitary member is a molded member.

18. A standoff retainer as defined in claim 15, wherein said molded unitary member is formed of nylon.

19. A standoff retainer as defined in claim 15, wherein said snap-fit retention means comprises:
- means defining an annular locking groove in said body adjacent said spacing ribs for radially compressive engagement in said body panel aperture and with said push-pin; and
- a plurality of circumferentially spaced barbs having outer surfaces extending radially outwardly beyond said body panel aperture and carried adjacent said locking groove and including means resiliently mounting said barbs with respect to said body and operative to permit deflection of said barbs radially inwardly to permit insertion of said barbs through said body panel aperture to a position wherein said locking groove is received in said body panel aperture.

* * * * *